(12) United States Patent
Grosjean et al.

(10) Patent No.: US 8,294,672 B2
(45) Date of Patent: Oct. 23, 2012

(54) SINGLE FAULT LASER DRIVER CONTROL FOR OPTICAL MOUSE

(75) Inventors: Sylvain Grosjean, Les Fins (FR); Michel Willemin, Prêles (CH); James Harold Lauffenburger, Colorado Springs, CO (US); Gil Afriat, Colorado Springs, CO (US); Kevin Scott Buescher, Colorado Springs, CO (US); Lawrence Bieber, Colorado Springs, CO (US)

(73) Assignee: EM Microelectronic-Marin S.A., Marin (CH)

( * ) Notice: Subject to any disclaimer, the term of this patent is extended or adjusted under 35 U.S.C. 154(b) by 1121 days.

(21) Appl. No.: 11/609,609

(22) Filed: Dec. 12, 2006

(65) Prior Publication Data

US 2008/0136779 A1   Jun. 12, 2008

(51) Int. Cl.
*G06F 3/033* (2006.01)
*G09G 5/08* (2006.01)
*H01S 3/13* (2006.01)
*H01S 3/00* (2006.01)

(52) U.S. Cl. .................. 345/166; 372/29.01; 372/29.02; 372/38.09

(58) Field of Classification Search .................. None
See application file for complete search history.

(56) References Cited

U.S. PATENT DOCUMENTS

| | | | | | |
|---|---|---|---|---|---|
| 4,995,045 | A | * | 2/1991 | Burley et al. | 372/38.09 |
| 5,309,295 | A | * | 5/1994 | Bailey et al. | 360/66 |
| 5,802,089 | A | * | 9/1998 | Link | 372/38.02 |
| 6,661,820 | B1 | * | 12/2003 | Camilleri et al. | 372/38.09 |
| 7,512,163 | B2 | * | 3/2009 | Marshall | 372/38.02 |
| 2002/0149810 | A1 | * | 10/2002 | Brown et al. | 359/110 |
| 2004/0004483 | A1 | * | 1/2004 | Hazelton | 324/522 |
| 2005/0244163 | A1 | * | 11/2005 | Hofmeister et al. | 398/135 |
| 2006/0034027 | A1 | * | 2/2006 | Moyer et al. | 361/93.1 |
| 2006/0226346 | A1 | | 10/2006 | Bieber et al. | |
| 2007/0280313 | A1 | * | 12/2007 | Hsieh et al. | 372/38.02 |

* cited by examiner

*Primary Examiner* — Amare Mengistu
*Assistant Examiner* — Antonio Xavier
(74) *Attorney, Agent, or Firm* — Griffin & Szipl, P.C.

(57) ABSTRACT

The invention concerns an optical pointing device comprising a coherent light source for illuminating a surface portion with radiation, a driver of the coherent light source for controlling coherent light emissions, a photodetector device responsive to radiation reflected from the illuminated surface portion, processing means for determining, based on the photodetector device response, a measurement of relative motion between the optical pointing device and the illuminated portion of the surface, wherein the coherent light source driver is a fault-tolerant driver comprising redundant power control means for limiting the output power of coherent light emissions.

8 Claims, 2 Drawing Sheets

SINGLE FAULT LASER DRIVER CONTROL FOR OPTICAL MOUSE

FIELD OF THE INVENTION

The present invention generally relates to optical pointing devices, in particular for controlling the position of a cursor on a screen, such as the display of a personal computer, workstation or other computing devices having a graphic user interface. Such optical pointing devices may for instance include mice, trackballs and other computer peripherals for controlling the position of a cursor on a display screen.

The present invention more particularly relates to the field of optical pointing devices which comprise a coherent light source for illuminating a portion of a surface with radiation, a driver of the coherent light source for controlling coherent light emissions, a photodetector device responsive to radiation reflected from the illuminated surface portion and processing means for determining, based on the photodetector device response, a measurement of relative motion between the optical pointing device and the illuminated portion of the surface and for generating cursor control signals based on said measurement.

BACKGROUND OF THE INVENTION

Such optical pointing devices using laser illumination device are already known in the art. US patent application No. 2006/0226346 A1, filed in the name of the same Assignee, for instance discloses, as shown on FIG. 2, an optical pointing device including a photodetector array 100 including a plurality of pixels, this photodetector array 100 being coupled to processing means 110 (or motion detection processing circuit) for processing the signals outputted by the photodetector array 100. A comparator array 120 may be interposed between processing means 110 and array 100, this comparator array 120 including a plurality of comparator circuits each for comparing the light intensity of a first pixel of array 100 with the light intensity of a second pixel of array 100 and for outputting resulting motion feature conditions.

The optical pointing device further comprises at least one coherent light source 130 such as a laser illumination source, which produces radiation at a determined flash rate, that impinges with a determined gradient on a portion of a surface S. Surface S may be a planar or non-planar surface, such as a surface over which the pointing device is moved (as in the case of an optical mouse), the surface of a ball (as in the case of an optical trackball) or any other suitable surface that may provide an appropriate speckled intensity pattern for detection by photodetector array 100.

Processing means 110 is further adapted to communicate in a bi-directional manner with an interface 140 that communicates in turn with a host system (not illustrated) over a bus 150. Cursor control signals (and eventually other signals related to the optical pointing device) are supplied to the host system over bus 150. Processing means 110 may also receive information, such as configuration signals, over bus 150 from the host system. Processing means 110 is essentially designed to intermittently sample the pixel outputs of photodetector array 100 in accordance with a defined sequence. The information of two successive samples or speckled images is compared and a relative motion measurement is extracted by processing means 110. The adequate cursor control signals are then derived from the relative motion measurement and transmitted to the host system via line interface 140.

Nevertheless, laser driven optical pointing device such as mice are required to meet stringent optical safety requirements. Actually, since an optical pointing device may be handled easily by the user, the laser could be potentially directed towards someone's eye. This necessitates the need for a fault tolerant design such that a single point failure anywhere in the laser driver path will not result in a harmful laser output power.

These safety requirements eventually along with additional system requirements create a difficult control problem in which the optical safety and system operation must exist simultaneously. A simple algorithm would consist in setting the laser power low enough that there is no danger of violating the laser power limits. However, this approach is not optimum because there is not sufficient light recovered by the photodetector to support high tracking speeds and/or high signal to noise ratio.

SUMMARY OF THE INVENTION

One goal of the present invention is thus to implement an optical pointing device in order to overcome aforecited drawbacks by preventing a single failure within the laser driver path to result in a harmful laser output power. For that purpose, the invention concerns an optical pointing device comprising a coherent light source for illuminating a surface portion with radiation, a driver of the coherent light source for controlling coherent light emissions, a photodetector device responsive to radiation reflected from the illuminated surface portion, and processing means for determining, based on the photodetector device response, a measurement of relative motion between the optical pointing device and the illuminated portion of the surface, wherein the coherent light source driver is a fault-tolerant driver comprising redundant power control means for limiting the output power of coherent light emissions. Thus, this invention allows the laser power to be programmed at the factory very near the maximum allowed output power with respect to safety requirements. Through monitoring and controlling of the coherent light source driver, the single point failure requirements and good system performances are simultaneously achieved.

Other advantageous embodiments form the subject of the dependent claims among with additional means for controlling the maximum output power by peak and/or average output power limitations.

BRIEF DESCRIPTION OF THE DRAWINGS

Other aspects, features and advantages of the present invention will be apparent upon reading the following detailed description of non-limiting examples and embodiments made with reference to the accompanying drawings.

DETAILED DESCRIPTION OF THE INVENTION

Figure 1:
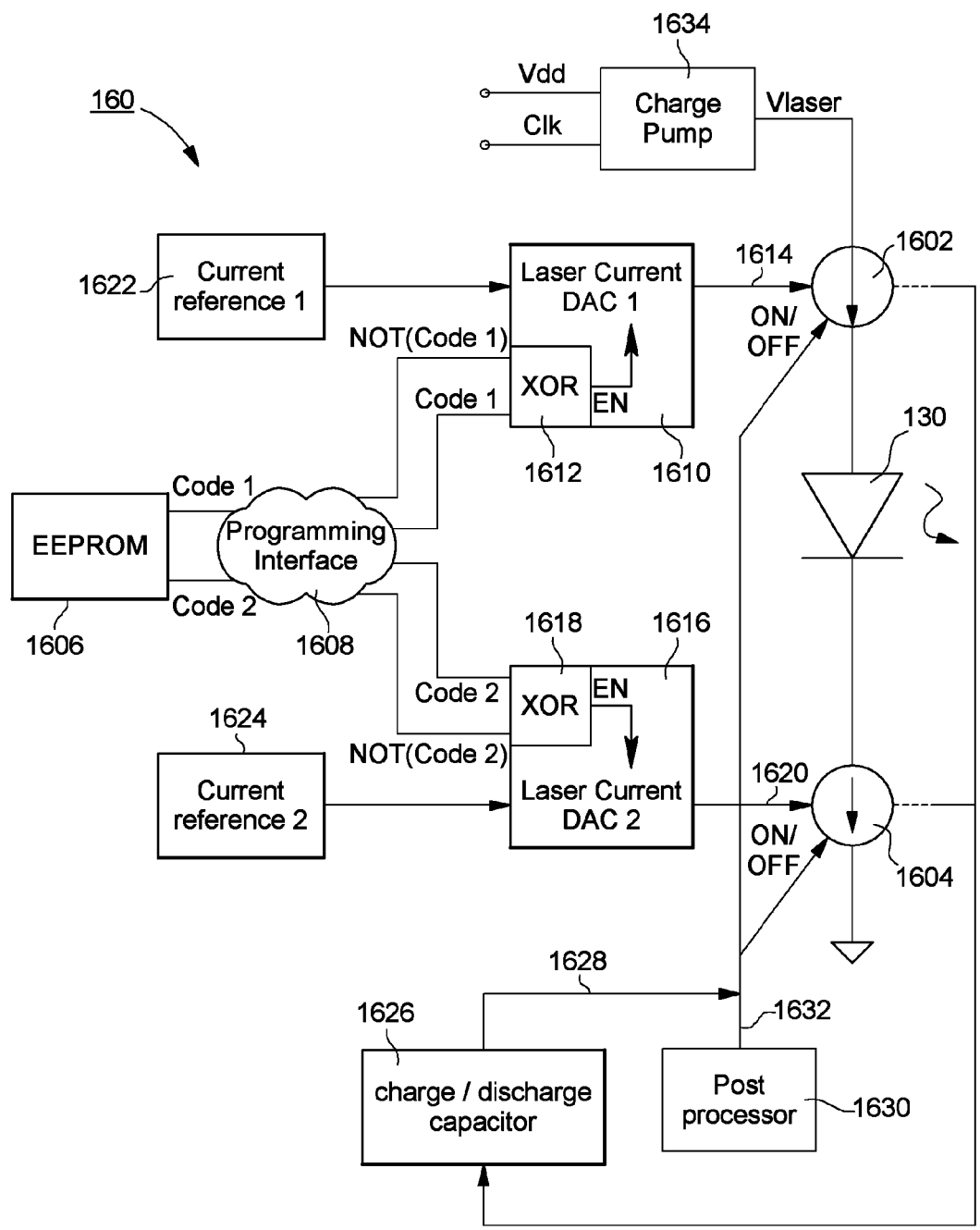
FIG. 1 is a schematic diagram of a fault tolerant laser driver according to several embodiments of the invention.
Figure 2:
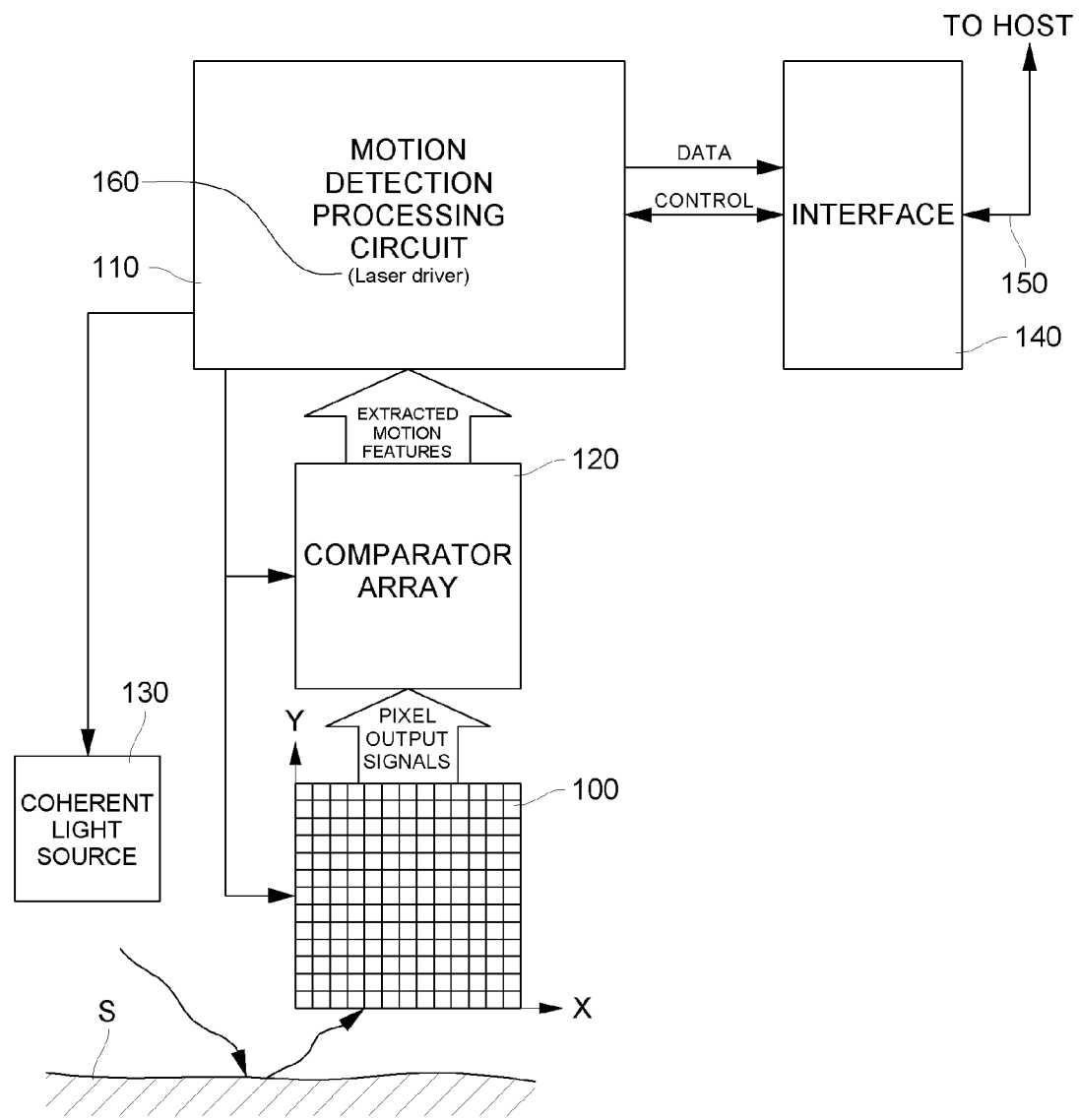
FIG. 2, already described, is a schematic diagram of an optical pointing device according to the prior art.

The following description given by way of a non limiting example concerns an optical pointing device which comprises a coherent light source (for instance a laser diode) for illuminating a portion of a surface with radiation, a driver of the coherent light source (for instance a so-called "laser driver") for controlling coherent light emissions, a photodetector device responsive to radiation reflected from the illuminated surface portion and processing means for determining, based on the photodetector device response, a measurement of relative motion between the optical pointing device and the illuminated portion of the surface, as generally represented in FIG. 2 and more particularly relates to the laser driver which will be detailed in relation with FIG. 1. It is to be noted that this laser driver may be implemented directly within the processing means or, alternatively, separately from them.

FIG. 1 shows a schematic diagram of a fault tolerant laser driver according to several embodiments of the invention. We retrieve coherent light source 130 of the optical pointing device which may be a laser illuminating device such as a laser diode. Coherent light emissions produced by laser diode 130 are controlled by a laser driver 160. This laser driver 160 comprises at least a current control path to control the current flowing through laser diode 130. Such current control path includes a current reference biasing a current source which in turn controls the current flowing through the laser diode. However, for fulfilling safety requirements in relation with coherent light emissions, one should take care of the output power of such coherent light sources.

For that purpose, according to a first embodiment of the present invention, laser driver 160 is provided with a dual path current control. This ensures that the single point failure requirement is met. The entire current control path is redundant for limiting the instantaneous output power of laser diode 130. The laser current and thus output power is controlled via a programmable current source 1602 and a programmable current sink 1604. Additionally, the current source 1602 and sink 1604 each has independent current references, respectively 1622 and 1624, so that a single failure cannot create excessive laser current.

Advantageously, each of the current source/sink has a different code, for instance Code 1 and Code 2 set in production trimming in EEPROM 1606. These codes are doubled, e.g. inverted and non inverted, within a programming interface 1608 (including the microcontroller) to avoid single point failure on this code. Then the microcontroller has to write two registers for each DAC, i.e. digital to analog converters 1610 and 1616. The two registers will be written with the code and the inverted code. Inside the DAC, the two registers values will be compared by inputting these values to XOR gates 1612 and 1618. If they are not a perfect inversion of each other, the DAC will be disabled, otherwise they are enabled. If enabled, current control signals 1614 and 1620 may be sent to current source 1602 and sink 1604. This eliminates single faults in EEPROM and the programming interface. Thus, the laser current programming path that is used to set the laser power is totally redundant. As explained above, it contains dual registers for each DAC that controls the laser source and sink currents. These registers contain inverted data that must be compared and any fault will disable the laser.

According to a second embodiment of the present invention, which could be easily added to the first embodiment above detailed, laser driver 160 comprises a duty cycle control 1626 including redundant means for limiting the average output power of coherent light emissions over a flash rate period. Actually, the optical pointing device and more specifically the laser diode 130 is periodically turned on at a selected flash rate. This flash rate period corresponds to the time during which the laser diode is on and off. For sake of simplicity in the following description, "on time" will be used to define the period of time within a flash rate period during which the laser diode is turned on, and conversely, "off time" will be used to define the period of time within a flash rate period during which the laser diode is off. Thus we have the following expression:

$$\text{Flash\_rate\_period} = T\text{on} + T\text{off} \quad (1);$$

The duty cycle corresponds to the ratio between on time over a flash rate period:

$$\text{Duty\_Cycle} = T\text{on}/(T\text{on} + T\text{off}) \quad (2);$$

In order to meet the safety requirements in terms of redundant control, digital means within the post processor 1630 controls the off time so that the duty cycle does not exceed a defined safety limit and meanwhile an off time control capacitor 1626 is charged during on time and discharged during off time with a minimum discharge level under which the laser may be turned on again. ON/OFF control signals 1632 and 1628 are generated accordingly.

Thus; the idea consists in limiting the off time according to the on time of the previous flash to insure a max duty cycle while keeping the average laser output power below the safety limits:

$$T\text{off\_min} = (T\text{on}/\text{max\_Duty\_Cycle}) - T\text{on} \quad (3);$$

It is to be noted that the on time and the required minimum off time are measured in a digital fashion by the post processor 1630 using the system clock.

In the meantime, an analog circuit monitors the duty cycle as a backup for single fault tolerance. During operation capacitor 1626 is charged while the laser is on and discharged when the laser is off. The laser is not allowed to turn on until the capacitor discharges below a known level (Off time control). This effectively limits the duty cycle to prevent exceeding the maximum average laser power.

Furthermore, the off time may be controlled according to the flash rate control algorithm by adjusting the maximum flash rate according to integration time to keep average laser power below average threshold.

According to a third embodiment of the present invention, which could be easily added to the first and/or second embodiments above detailed, laser driver 160 comprises a maximum laser on time control for limiting the output power of coherent light emissions during on time periods. In addition or alternatively to the duty cycle control, which ensures a limit on the average laser output power over a period of time, it is important to control the maximum on time of the laser during one pulse. This is done (like for the duty cycle control) in both digital and analog fashions for single fault tolerance. The on time of the laser is measured by the post processor 1630 using the system clock, and will turn off the laser when it had exceeded a pre-defined value. An analog circuit is charging a capacitor 1626 during the on time. When the capacitance voltage exceeds a pre-defined value, the laser will be turned off. When the laser is off the capacitor is reset (Vcap=0V). Advantageously, the same capacitor 1626 is used for both second and third embodiments.

In addition to any of the previous embodiments, it is provided with the laser driver a capacitive step up (or charge pump 1634) to create the required laser voltage supply (Vlaser). This feature actually serves two purposes. First it allows the laser to operate from power supplies that are of a lower voltage than the laser turn on voltage. The second purpose is a safety feature that prevents the laser from locking on. The charge pump operation steps up the laser voltage during the laser off time to a level well above the laser turn on voltage by storing charge on a capacitor. When the laser is enabled the charge on the capacitor is slowly depleted. The laser will continue to output power until it is disabled by the post processor 1630 or the capacitor 1626 is discharged sufficiently that the voltage is below the minimum laser operating voltage.

It is to be noted that photodiode COB is no more needed along with such a laser driver as described above.

What is claimed is:

1. An optical pointing device comprising:
   (a) a coherent light source for illuminating a surface portion with radiation;
   (b) a driver of the coherent light source for controlling a coherent light emission;
   (c) a photo-detector device responsive to radiation reflected from an illuminated surface portion; and
   (d) processing means for determining, based on the photo-detector device response, a measurement of relative motion between the optical pointing device and the illuminated surface portion;
   wherein the driver of the coherent light source is a fault-tolerant driver comprising redundant power control means of an output power of the coherent light emission, wherein the redundant power control means comprises two current units that are respectively defined by a current source and a current sink both limiting to a substantially constant current intensity through the coherent light source and both are respectively controlled by two separate current control paths, and wherein the current source and the current sink respectively have two independent current references in respective separate current control paths that respectively determine the substantially constant current intensity in the current source and the current sink, and
   wherein each of the two current units has a digital to analog converter in a respective current control path, and wherein the redundant power control means further comprises two different codes stored in a memory, wherein these two different codes are respectively provided to both separate current control paths, and
   wherein the redundant power control means also comprises a programming interface that determines, for each of the two different codes, an inverted code, wherein the programming interface provides two registers to each of both digital to analog converters that are respectively written with the code and inverted code associated with a corresponding current control path, wherein the two digital to analog converters each have an XOR circuitry to which the two registers are provided, and the XOR circuitry enables the corresponding digital to analog converter only when a perfect inversion occurs.

2. The optical pointing device according to claim 1, wherein said redundant power control means is arranged for limiting the instantaneous output power of said coherent light emission.

3. The optical pointing device according to claim 1, wherein said two current units are respectively defined by a programmable current source and a programmable current sink both controlling current intensity of the coherent light source.

4. The optical pointing device according to claim 1, wherein said coherent light source is periodically turned on at a selected flash rate, wherein said redundant power control means includes redundant means for limiting average output power of the coherent light emission over one flash rate period.

5. The optical pointing device according to claim 4, wherein a flash rate period corresponds to the time during which said coherent light source is turned on and off periodically and wherein a duty cycle corresponds to the ratio between on time over a flash rate period, and wherein said means for limiting the average output power of the coherent light emission over one flash rate period comprises digital means for controlling the off time of said coherent light source so that the duty cycle does not exceed a defined safety limit and an off time control capacitor which is charged during on time and discharged during off time with a minimum discharge level under which said coherent light source may be turned on again.

6. The optical pointing device according to claim 1, wherein said coherent light source is periodically turned on at a selected flash rate, and wherein said redundant power control means includes redundant means for limiting the output power of the coherent light emission during on time periods, and wherein said means for limiting the output power of the coherent light emission during the on time periods comprises digital means which turns off the coherent light source when the coherent light emission exceeds a predetermined value and an on time control capacitor which is charged during on time until the on time control capacitor reaches said predefined value above which said coherent light source is turned off.

7. The optical pointing device according to claim 1, wherein said two independent current references are respectively provided to both digital to analog converters.

8. An optical pointing device comprising:
   (a) a coherent light source for illuminating a surface portion with radiation;
   (b) a driver of the coherent light source for controlling a coherent light emission;
   (c) a photo-detector device responsive to radiation reflected from an illuminated surface portion; and
   (d) processing means for determining, based on the photo-detector device response, a measurement of relative motion between the optical pointing device and the illuminated surface portion;
   wherein the driver of the coherent light source is a fault-tolerant driver comprising redundant power control means of an output power of the coherent light emission, wherein the redundant power control means comprises two current units that are respectively defined by a current source and a current sink both limiting to a substantially constant current intensity through the coherent light source and both are respectively controlled by two separate current control paths, and wherein the current source and the current sink respectively have two independent current references in respective separate current control paths that respectively determine the substantially constant current intensity in the current source and the current sink, and
   wherein each of the two current units has a digital to analog converter in a respective current control path, and wherein the two independent current references are respectively provided to both digital to analog converters, and wherein the redundant power control means further comprises two different codes stored in a memory, wherein these two different codes are respectively provided to both separate current control paths, and
   wherein the redundant power control means also comprises a programming interface that determines, for each of the two different codes, an inverted code, wherein the programming interface provides two registers to each of both digital to analog converters that are respectively written with the code and inverted code associated with a corresponding current control path, wherein the two digital to analog converters each have an XOR circuitry to which the two registers are provided, and the XOR circuitry enables the corresponding digital to analog converter only when a perfect inversion occurs.

* * * * *